United States Patent
Meggiolan

(10) Patent No.: US 7,131,258 B2
(45) Date of Patent: Nov. 7, 2006

(54) DEVICE FOR CLOSING A CHAIN, PARTICULARLY A BICYCLE CHAIN

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 11/285,023

(22) Filed: Nov. 22, 2005

(65) Prior Publication Data

US 2006/0070369 A1    Apr. 6, 2006

Related U.S. Application Data

(63) Continuation of application No. 10/888,188, filed on Jul. 9, 2004, now Pat. No. 6,966,170, which is a continuation of application No. 10/193,008, filed on Jul. 11, 2002.

(30) Foreign Application Priority Data

Jul. 11, 2001 (IT) .......................... TO2001A0677

(51) Int. Cl.
F16G 5/18 (2006.01)
F16G 15/06 (2006.01)

(52) U.S. Cl. ............................. 59/7; 59/35.1; 474/206; 474/218

(58) Field of Classification Search ...................... 59/7, 59/9, 35.1, 85; 474/206, 225, 231, 233
See application file for complete search history.

(56) References Cited

U.S. PATENT DOCUMENTS

| 547,964 | A |  | 10/1895 | Nesmith |  |
|---|---|---|---|---|---|
| 2,826,893 | A |  | 3/1958 | Falk et al. |  |
| 3,816,900 | A | * | 6/1974 | Spraker | 59/7 |
| 3,943,702 | A |  | 3/1976 | Lacombe-Allard |  |
| 4,157,594 | A | * | 6/1979 | Raabe | 59/7 |
| 4,494,945 | A |  | 1/1985 | Ogino |  |
| 4,983,147 | A |  | 1/1991 | Wu |  |
| 4,998,907 | A |  | 3/1991 | Sawada |  |
| 5,186,569 | A |  | 2/1993 | Wu |  |
| 5,299,416 | A | * | 4/1994 | Wu | 59/7 |
| 5,305,594 | A | * | 4/1994 | Wang | 59/4 |
| 5,362,282 | A |  | 11/1994 | Lickton |  |
| 5,376,055 | A |  | 12/1994 | Bauman |  |
| 5,461,852 | A |  | 10/1995 | Nagamatsu |  |
| 5,934,061 | A | * | 8/1999 | Smith | 59/7 |
| 6,176,798 | B1 |  | 1/2001 | Nakamura |  |
| 6,364,799 | B1 |  | 4/2002 | Campagnolo |  |
| 6,966,170 | B1 | * | 11/2005 | Meggiolan | 59/7 |

FOREIGN PATENT DOCUMENTS

GB    319503    9/1929

* cited by examiner

*Primary Examiner*—David Jones
(74) *Attorney, Agent, or Firm*—Volpe and Koenig, P.C.

(57) ABSTRACT

Device for closing a chain, particularly a bicycle chain, comprising a first and a second pair of end outer plates connected by at least one pair of inner plates, a pair of rivets so engaging a pair of end holes of the first and the second pair of outer plates and the corresponding holes of a pair of, inner plates arranged at the ends of the chain.

6 Claims, 3 Drawing Sheets

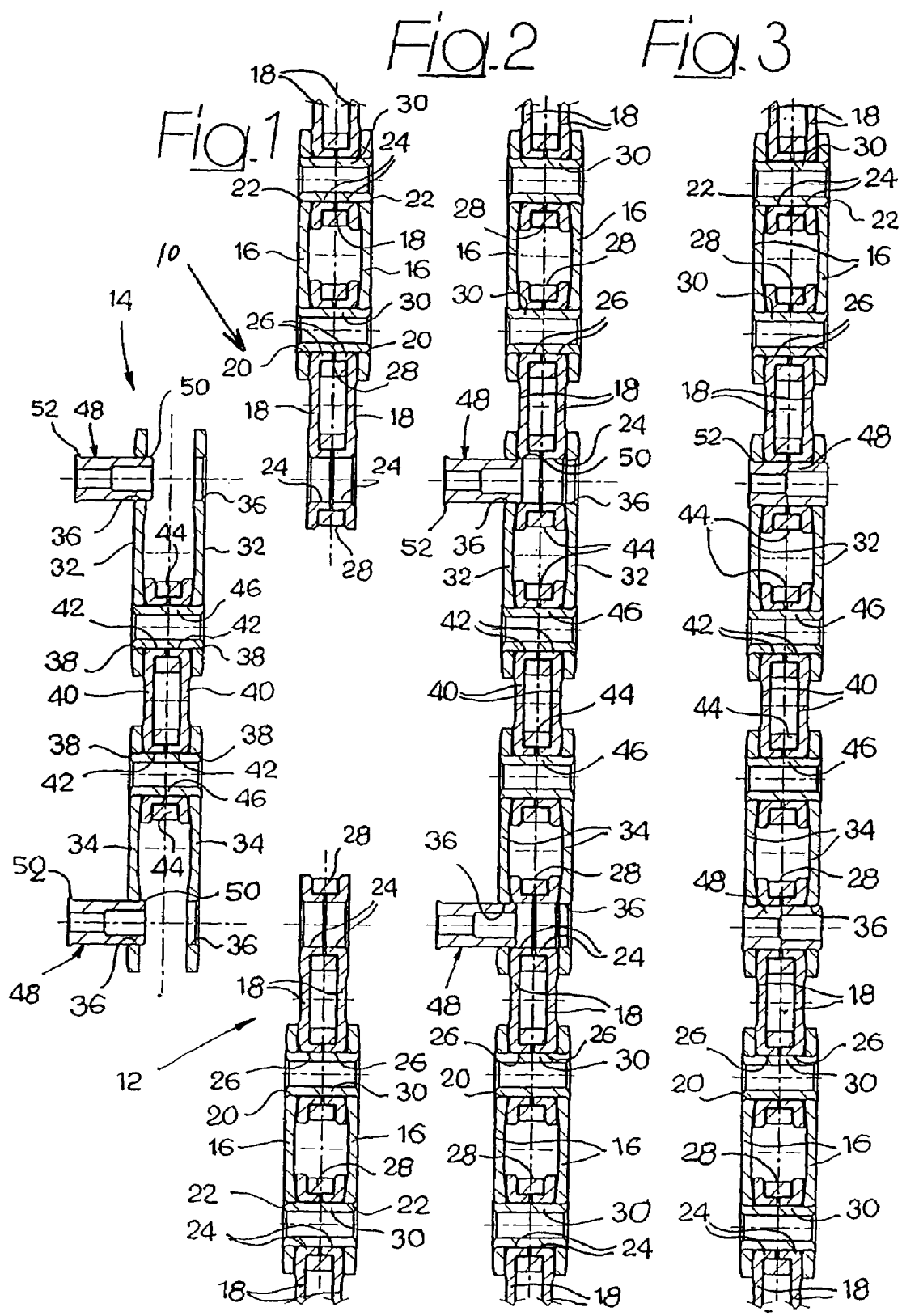

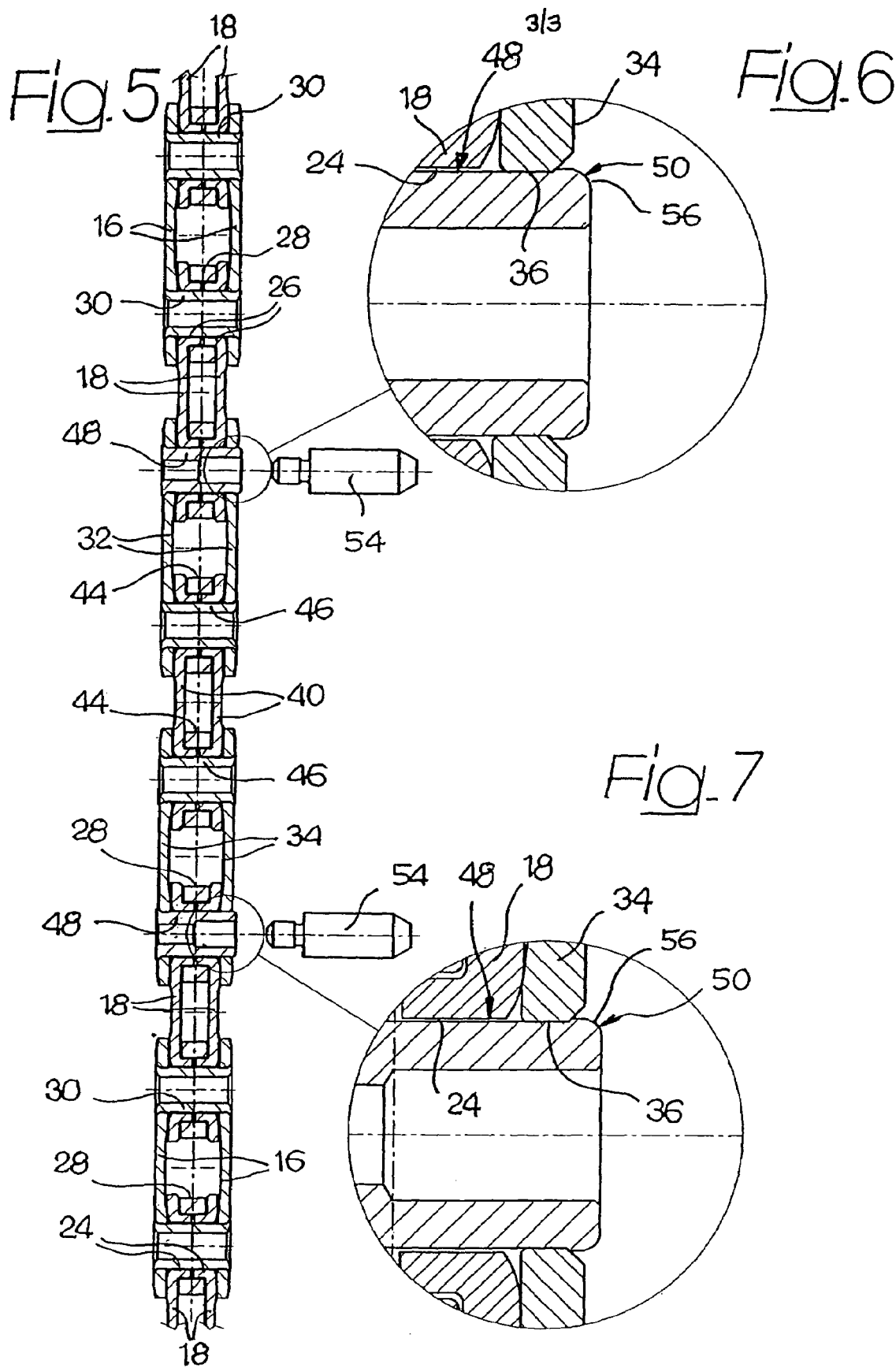

DEVICE FOR CLOSING A CHAIN, PARTICULARLY A BICYCLE CHAIN

CROSS REFERENCE TO RELATED APPLICATIONS

Figure 4:
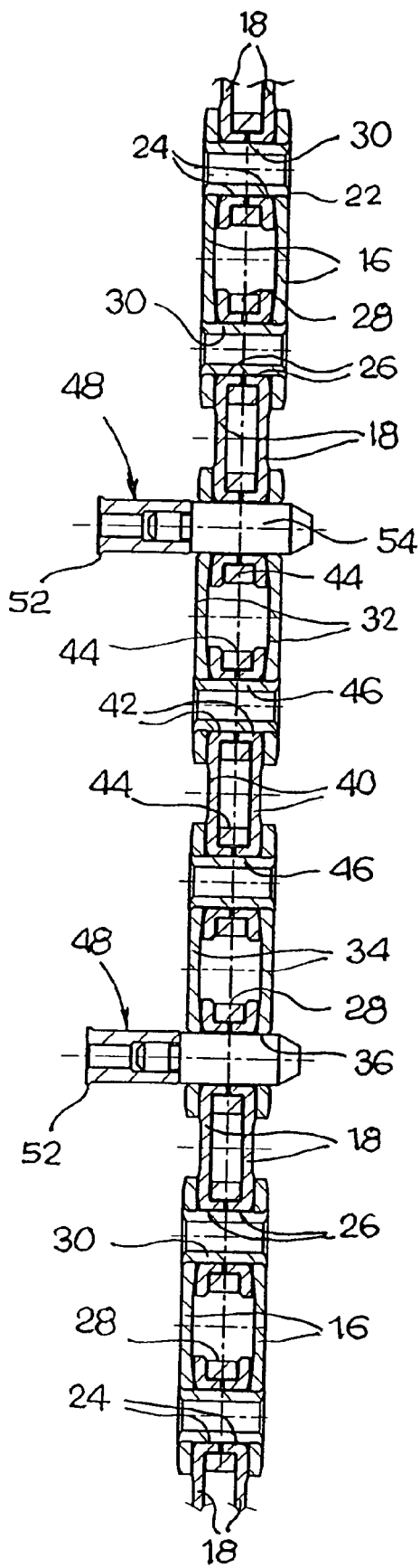

This application is a continuation of U.S. patent application Ser. No. 10/888,188 filed Jul. 9, 2004, now U.S. Pat. No. 6,966,170, which is a continuation of Ser. No. 10/193,008, filed Jul. 11, 2002 which is incorporated in its entirety as fully set forth herein.

FIELD OF INVENTION

This invention relates to a device for closing a chain, particularly a bicycle chain. In the following description and claims herein, the term "closing" referred to a chain indicates the reciprocal connections of the two ends of the chain.

BACKGROUND

As known, a bicycle chain consists of a set of links, each of which comprises a pair of outer plates, a pair of inner plates and a rivet inserted in aligned holes in the inner plates and in the outer plates. The ends of the rivet are flushed after inserting the rivet in the aligned holes of the outer plates and the inner plates, so to form retainer portions, which diameter is larger than the diameter of the holes in the outer plates. The flushed portions of the rivet prevent the rivet from slipping out in the direction of its axis. Normally, bicycle chains are supplied "open" and the two ends of the chain are connected after the chain has been arranged around the chain wheels and the sprockets on the bicycle. Normally, when the chain is fitted, its length must be adjusted by removing a certain number of links. This is done by removing a rivet. Further, the length of the chain must be also adjusted when the bicycle gears and/or sprockets are replaced.

In the known solutions, a pair of outer plates must be left on a first end of the chain and a pair of inner plates must be left on the other end of the chain. The outer plates and the inner plates on the ends are arranged with their respective holes aligned and a new rivet is inserted in said aligned holes to close the chain.

The main problem of known solutions consists in that the holes of the outer plates are damaged when a rivet is removed to adjust the chain length, especially when the ends of the rivets of the chain present a high interference in the radial direction with the holes of the outer plates. In the known solutions, the closing point of a chain is critical in terms of resistance due to the damaged outer plate holes.

SUMMARY

The present invention concerns devices for bringing the ends of a chain, especially bicycle chains, together to form the transmission chains normally associated with power transfer in pedal driven vehicles.

BRIEF DESCRIPTION OF THE DRAWING(S)

This invention will be better explained by the following detailed descriptions with reference to the accompanying figure as non-limiting example, whereas:

FIGS. 1, 2 and 3 illustrate the assembly sequence of a device for closing a chain according to a first form of embodiment of this invention, FIGS. 4 and 5 illustrate the assembly sequence of an alternative embodiment of a device according to this invention and FIGS. 6 and 7 are enlarged details of the respective encircled portions of FIG. 5.

DETAILED DESCRIPTION OF THE PREFERRED EMBODIMENTS

As used herein, the terms "closing" or "closed" refer to being the free ends of the chain into a desired position and using a device to connection them endless.

With reference to FIG. 1, numerals 10 and 12 respectively indicate two ends of a bicycle chain. Numeral 14 indicates a chain closing device according to this invention, which is used to reciprocally connect the two ends 10, 12.

The chain comprises a set of chain link of the known type. Each link comprises a pair of outer plates 16 and a pair of inner plates 18. Each outer plate 16 has two holes 20, 22 and each inner plate 18 has two holes 24, 26, preferably provided with flushed portions forming respective bushings. Each pair of inner plates 18 is connected to two rollers 28 fitted to turn on the bushings aligned with the holes 24, 26. The aligned holes 20, 26 and 22, 24 receive the respective rivets 30, which ends are flushed after inserting the rivet in the holes 20, 26 or 22, 24. Each rivet 30 couples holes 24 or 26 of the inner plates 18 leaving play and couples holes 20 or 22 of the outer plates 16 with interference.

As it appears from FIG. 1, the chain to be closed terminates at both ends 10 and 12 with a pair of end inner plates 18. The two ends 10, 12 are connected by means of the closing device 14 according to this invention, which comprises a first pair of outer links 32 and a second pair of outer links 34. The outer plates 32, 34 are provided with respective holes 36. The device comprises at least one pair of inner plates 40 provided with holes 42 with flushed portions forming bushings on which the respective rollers 44 turn. The inner plates 40 pivot on the outer plates 32, 34 by means of a pair of rivets 46 with flushed ends. The closing device 14 can further comprise any number of chain links (each one, as already said, comprising a pair of outer plates, a pair of inner plates, a roller and a rivet) so as to form a chain section of any predetermined length. In any case, both ends of the closing device 14 terminate with outer plates 32, 34.

The end outer plates 32, 34 of the device 14 are associated with a pair of rivets 48, each of which is destined to be inserted through the holes 36 of the end outer plates 32, 34 of the closing device 14 and through the holes 24 of the inner plates 18 of the end portions 10, 12 of the chain. Preferably, each rivet 48 has an insertion portion 50 clipping into the holes 36 of the outer plates 32, 34 and a head portion 52 coming into contact with the outer surface of the corresponding outer plate 32.

In the embodiment shown in FIG. 1, the rivets 48 are clipped only into one of the holes 36 of the outer plates 32. In the example shown in FIG. 1 both rivets project on the same side of the closing device 14. In a possible alternative form of embodiment, the rivets can be arranged so to project from opposite sides of the closing device.

The closing device 14 is fitted according to the sequence shown in FIGS. 2 and 3. In a first phase, shown in FIG. 2, the outer plates 32, 34 of the closing device 14 are arranged outside the end inner plates 18 of the end portions 10, 12 and the chain, so that the holes 36 of the outer plates 32, 34 are aligned with the holes 24 of the inner plates 18. Later on, as shown in FIG. 3, the device is closed by inserting the rivets 48 in the aligned holes 24, 36 the end of travel of the rivet, defined by the condition in which the head portion 52 comes into contact with the external surface of the corresponding plate 32. After assembly, the portions 50 of the rivets 48 clip into the corresponding holes 36 of the plates 32.

FIGS. 4 and 5 illustrate an alternative embodiment of the closing device according to this invention. The parts corresponding to those described above are indicated with the same reference numerals. In this case, each rivet 48 is provided with a guide element 54 for guiding the insertion of the rivet 48 in the aligned holes 36, 24 of the outer plates 32, 34 and the inner plates 18. Each rivet 48 and corresponding guide element 54 is preferably made as described in co-pending U.S. patent application Ser. No. 10/165,147, filed on Jun. 7, 2002, assigned to the assignee hereof, and incorporated herein as if fully set forth. The guide element 54 is separate from the rivet 48 and is removed after completing the insertion of the rivet, as shown in FIG. 5. FIGS. 6 and 7 illustrate on a larger scale the clip engagement position of the rivet after fitting. The rivets 48 used in the alternative embodiment shown in FIGS. 4 and 5 can be identical or different from those used in the embodiment shown in FIGS. 1, 2 and 3. In the version illustrated in FIGS. 4 and 5, the rivets 48 are not preventively inserted in a hole 36 because in this case the guide element 54 is inserted in the aligned holes 36, 24 before planting the rivet. The clip engagement portion 50 of each rivet 48 presents a rounded portion 56 for elastically widening the hole 36 so to engage by clipping without damaging the holes.

What is claimed is:

1. A device for closing a bicycle chain having free ends that terminate in pairs of inner plates, the devise comprising free ends that terminate in pairs of outer plates connected to opposite ends of at least a pair of inner plates.

2. The device of claim 1 wherein the pairs of free end outer plates are connected to different pairs of inner plates.

3. The device of claim 1 wherein the pairs of free end outer plates include fasteners selected to connect a respective pair of outer plates to a respective pair of inner plates at the free ends of a bicycle chain.

4. The device of claim 3 wherein the pairs of free end outer plates are connected to different pairs of inner plates.

5. The device of claim 3 wherein each of the fasteners is associated with a guide element that aligns apertures defined in corresponding pairs of free end outer plates and pairs of free end inner plates.

6. The device of claim 5 wherein the pairs of free end outer plates are connected to different pairs of inner plates.

* * * * *